US007170465B2

(12) United States Patent
Rofougaran

(10) Patent No.: US 7,170,465 B2
(45) Date of Patent: *Jan. 30, 2007

(54) RF DIVERSITY ANTENNA COUPLING STRUCTURE

(75) Inventor: Ahmadreza (Reza) Rofougaran, Marina Del Ray, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/120,859

(22) Filed: May 3, 2005

(65) Prior Publication Data
US 2005/0215205 A1    Sep. 29, 2005

Related U.S. Application Data

(63) Continuation of application No. 10/683,185, filed on Oct. 10, 2003, now Pat. No. 6,919,858.

(51) Int. Cl.
*H01Q 1/38* (2006.01)
*H04B 1/44* (2006.01)

(52) U.S. Cl. .............................. 343/850; 343/700 MS; 343/749; 455/78; 455/101

(58) Field of Classification Search ............... 343/850, 343/822, 749–750, 700 MS, 860, 795, 852; 455/101, 272, 78, 575.7
See application file for complete search history.

(56) References Cited

U.S. PATENT DOCUMENTS

2003/0107441 A1 *   6/2003   Grasset et al. .............. 330/302

* cited by examiner

*Primary Examiner*—Tho Phan
*Assistant Examiner*—Chuc Tran
(74) *Attorney, Agent, or Firm*—Garlick Harrison & Markison; Timothy W. Markison

(57) ABSTRACT

AN RF diversity antenna coupling structure includes a differential low noise amplifier, a differential power amplifier, a first switch coupled to a first antenna, a second switch coupled to a second antenna, a first transformer, a second transformer, a transformer balun. The first transformer includes a primary winding and a secondary winding, wherein the primary winding of the first transformer is operably coupled to a differential output of the power amplifier, and wherein the secondary winding of the first transformer has a desired output impedance. The second transformer includes a primary winding and a secondary winding, wherein the primary winding of the second transformer is operably coupled to a differential input of the low noise amplifier, and wherein the secondary winding of the second transformer has a desired output impedance. The transformer balun includes a first winding and a second winding, wherein the first winding is operably coupled to the secondary windings of the first and second transformers, one node of the second winding is operably coupled to the first antenna and a second node of the second winding is operably coupled to the second antenna.

5 Claims, 4 Drawing Sheets antenna coupling structure 73 antenna coupling structure 73 antenna coupling structure 73

RF DIVERSITY ANTENNA COUPLING STRUCTURE

This patent application is claiming priority under 35 USC § 120 as a continuing patent application of patent application entitled RF Antenna Coupling Structure, having a filing date of Oct. 10, 2003, and a Ser. No. 10/683,185 now U.S. Pat. No. 6,919,858.

BACKGROUND OF THE INVENTION

1. Technical Field of the Invention

This invention relates generally to communication systems and, more particularly, to radio receivers and transmitters used within such communication systems.

2. Description of Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or multiple channels (e.g., one or more of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel, or channels. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, demodulates the RF carrier frequency from the RF signals via one or more intermediate frequency stages to produce baseband signals, and demodulates the baseband signals in accordance with a particular wireless communication standard to recapture the transmitted data. The transmitter converts data into RF signals by modulating the data in accordance with the particular wireless communication standard to produce baseband signals and mixes the baseband signals with an RF carrier in one or more intermediate frequency stages to produce RF signals.

To recapture data from RF signals, a receiver includes a low noise amplifier, down conversion module and demodulation module. To convert data into RF signals, a transmitter includes a power amplifier, an up-conversion module and a modulation module. For radio frequency integrated circuits (RFICs), it is desirable to provide the low noise amplifier and the power amplifier with differential RF signals, instead of single-ended RF signals, to improve noise performance and common mode rejection. To convert received single-ended RF signals into differential RF signals for a receiver, and to convert differential RF signals into single-ended signals for a transmitter, the receiver and/or the transmitter includes a balun (i.e., a balanced/unbalanced transformer).

Until very recently, the baluns were off-chip, i.e., on the printed circuit board, and were typically implemented in the form of micro-strip lines. However, for semiconductor chip designs, it is desirable to place RFIC baluns on-chip to reduce the cost of off-chip printed circuit board components. Recent attempts to integrate a balun onto a radio frequency integrated circuit have had limited success. For example, parallel winding, inter-wound winding, overlay winding, single planar, square wave winding, and concentrical spiral winding on-chip baluns have been tried with limited success. Each of these on-chip baluns suffers from one or more of: low quality factor, (which causes the balun to have a relatively large noise figure and large energy loss); too low of a coupling coefficient (which results in the inductance value of the balun not significantly dominating the parasitic capacitance making impedance matching more complex); asymmetrical geometry (which results in degradation of differential signals); and a relatively high impedance ground connection at the operating frequency.

Other problems exist for RFICs that include on-chip baluns. For example, a power amplifier (PA) and a low noise amplifier (LNA) have different balun requirements. An LNA balun should provide a high voltage gain with a low noise figure (NF), which is directly related to the quality factor (Q) of the balun. An LNA balun should also be inductive enough such that only on-chip capacitors are needed for impedance matching with the antenna and to provide the required voltage gain. A PA balun, however, is required to support large currents, which requires a large track width of the transformer windings. The PA balun quality factor (Q) should also be high to provide high efficiency and high PA linearity and should have enough current amplification to provide a large current swing at the antenna output. The PA balun should also be inductive enough such that only on-chip capacitors are needed for impedance matching with the antenna.

Therefore, a need exists for an integrated radio frequency (RF) integrated circuit that includes a symmetrical balun antenna coupling structure that meets the differing operational requirements of both the LNA and the PA.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
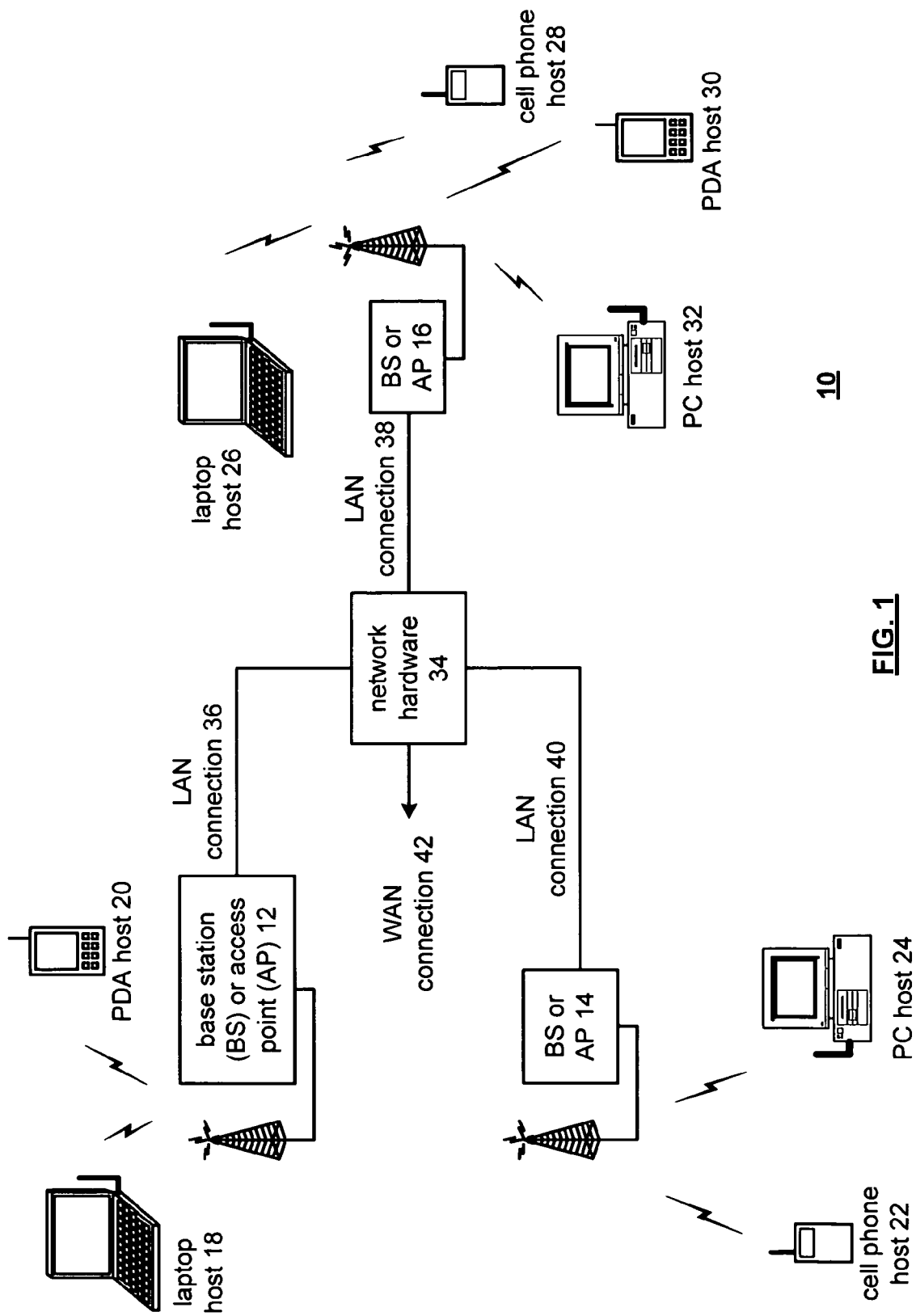
FIG. 1 illustrates a schematic block diagram of a wireless communication system in accordance with the present invention.

FIG. 1 illustrates a schematic block diagram of a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera, provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes an integrated RF front-end architecture as disclosed herein to enhance performance of radio frequency integrated circuits.

Figure 2:
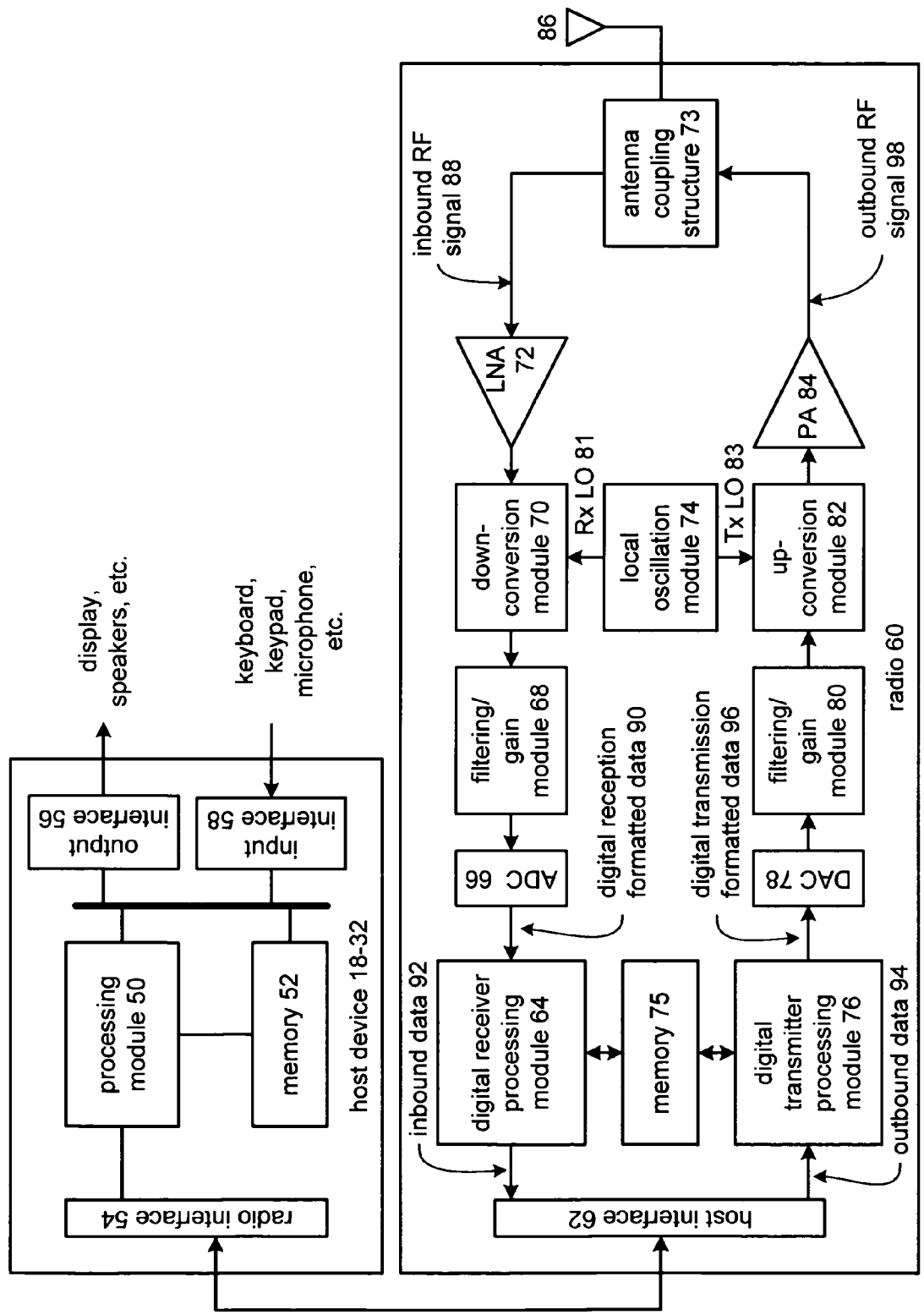
FIG. 2 illustrates a schematic block diagram of a wireless communication device in accordance with the present invention.

FIG. 2 illustrates a schematic block diagram of a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera, such that the received data may be displayed. The radio interface 54 also provides outbound data from the processing module 50 to the radio 60. The processing module 50 may receive the outbound data from an input device such as a keyboard, keypad, microphone, et cetera, via the input interface 58 or generate the data itself. For data received via the input interface 58, the processing module 50 may perform a corresponding host function on the data and/or route it to the radio 60 via the radio interface 54.

Radio 60 includes a host interface 62, a receiver section, a transmitter section, local oscillation module 74, an antenna coupling structure 73, and an antenna 86. The receiver section includes a digital receiver processing module 64, analog-to-digital converter 66, filtering/gain module 68, down conversion module 70, low noise amplifier (LNA) 72, and at least a portion of memory 75. The transmitter section includes a digital transmitter processing module 76, digital-to-analog converter 78, filtering/gain module 80, up-conversion module 82, power amplifier 84, and at least a portion of memory 75. The antenna 86 may be a single antenna that is shared by the transmit and receive paths via the antenna coupling structure 73 or multiple antennas to provide a diversity antenna arrangement. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84 amplifies the RF signal to produce outbound RF signal 98 and routes the outbound RF signal 98 to the antenna 86 via the antenna coupling structure 73. The antenna 86 transmits the outbound RF signal 98 to a targeted device such as a base station, an access point and/or another wireless communication device.

The radio 60 also receives, via the antenna 86 and the antenna coupling structure 73, an inbound RF signal 88, which can be transmitted by a base station, an access point, or another wireless communication device. The antenna coupling structure 73 provides the inbound RF signal 88 to the LNA 72, which amplifies the signal 88 to produce an amplified inbound RF signal. The RF front-end 72 provides the amplified inbound RF signal to the down conversion module 70, which directly converts the amplified inbound RF signal into an inbound low IF signal based on a receiver local oscillation provided by local oscillation module 74. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the radio may be implemented in a variety of ways to receive RF signals and to transmit RF signals and may be implemented using a single integrated circuit or multiple integrated circuits. Further, at least some of the modules of the radio 60 may be implemented on the same integrated circuit with at least some of the modules of the host device 18-32. Regardless of how the radio is implemented, the concepts of the present invention are applicable.

Figure 3:
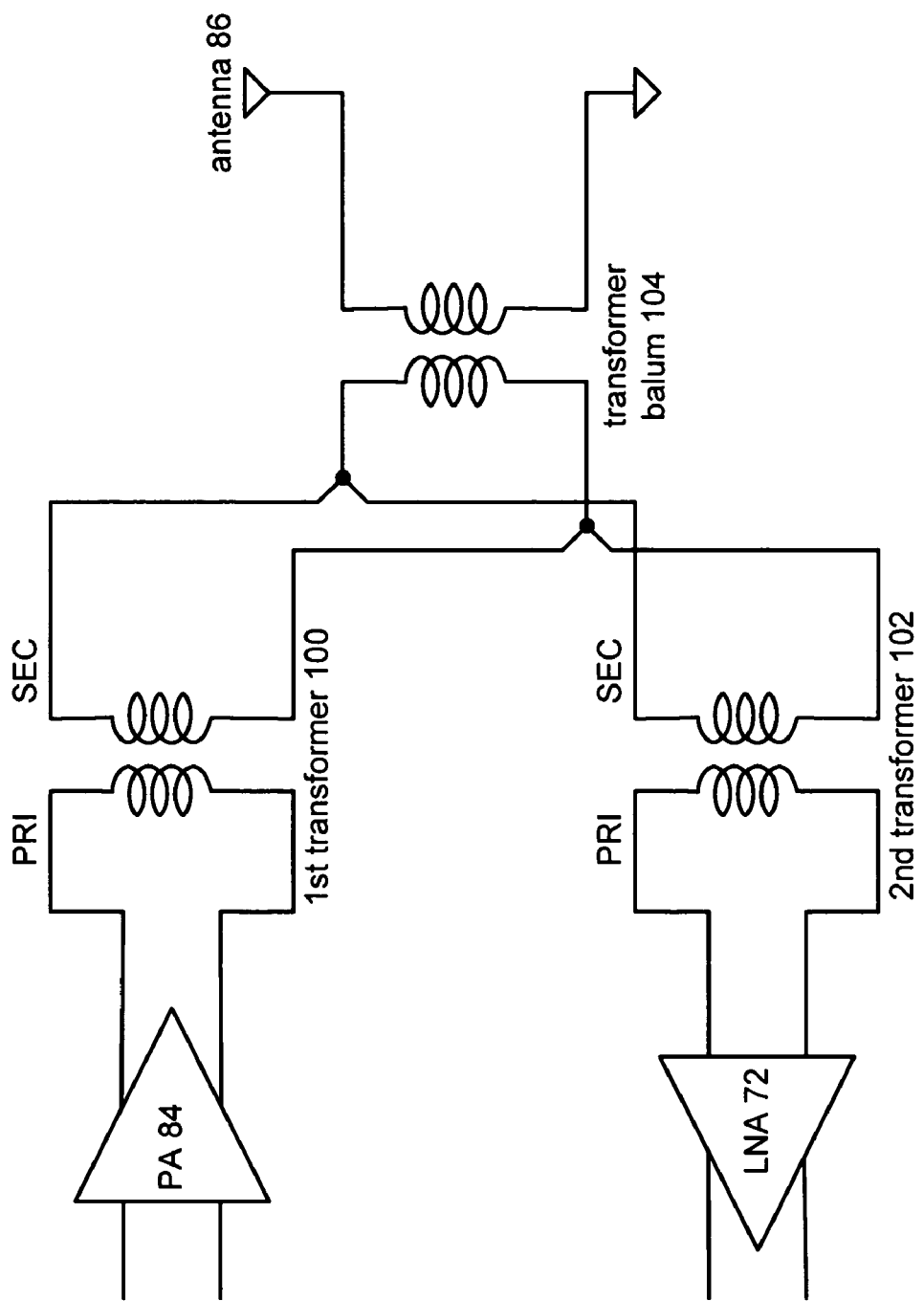
FIG. 3 illustrates a schematic block diagram of an antenna coupling structure in accordance with the present invention.

FIG. 3 is a schematic block diagram of an antenna coupling structure 73 operably coupled to a power amplifier 84, a low noise amplifier 72, and an antenna 86. The antenna coupling structure 73 includes a transformer balun 104, a first transformer 100, and a second transformer 102. The transformer balun 104 may be constructed in accordance with the teachings of co-pending patent application entitled ON-CHIP TRANSFORMER BALUN, having a filing date of Jan. 23, 2002, and a Ser. No. 10/055,425, which is incorporated herein by reference and may further have a one-to-one turns ratio. The transformer balun 104 has a single-ended winding that is couple to the antenna 86 and to ground and a differential winding that is coupled to the second windings of both the first and second transformers 100 and 102.

As is further shown, the primary winding of the first transformer 100 is coupled to the differential output of the power amplifier 84. The first transformer 100 includes a large track width of the transformer windings to support the large currents of the power amplifier 84. In additions, the first transformer 100 has a high quality factor (Q) (e.g., greater than 10) to provide a highly efficiency and highly linear coupling to the power amplifier 84. Further, the first transformer 100 includes a gain (e.g., two or more) to amplify the output current of the power amplifier 84 to provide a large current swing at the antenna output. Still further, the primary winding of the first transformer 100 has a desired impedance of, for example 200 Ohms, to substantially match the output load impedance of the power amplifier 84. The secondary winding of the first transformer 100 has a desired impedance of, for example 50 Ohms, to substantially match the impedance requirements of the antenna 86.

As is also shown, the primary winding of the second transformer 102 is coupled to the differential input of the low noise amplifier 72. The second transformer 102 has a high voltage gain with a low noise figure (NF). The primary winding of the second transformer 100 has a desired impedance of, for example 1000 Ohms, to substantially match the input impedance requirements of the low noise amplifier 72. The secondary winding of the second transformer 102 has a desired impedance of, for example 50 Ohms, to substantially match the impedance requirements of the antenna 86.

In operation, the radio 60 is either transmitting or receiving RF signals. Accordingly, the power amplifier 84 and the low noise amplifier 72 each include an enable circuit, where, when the radio 60 is transmitting RF signals, the power amplifier 84 is on and the low noise amplifier 72 is off and, when the radio is receiving RF signals, the power amplifier 84 is off and the low noise amplifier 72 is on. Thus, when RF signals are being transmitted, the power amplifier 84 provides differential signals to the $1^{st}$ transformer 100, which adjusts the impedance and current level of the differential signals and provides the adjusted differential signals to the transformer balun 104. The transformer balun 104 converts the differential signals into single-ended signals that are radiated by the antenna 86.

When RF signals are received, the transformer balun 104 converts the single-ended RF signals into differential signals. The second transformer 102 receives the differential signals and adjusts them and provides the adjusted RF differential signals to the low noise amplifier 102. With such an antenna structure, an integrated radio frequency (RF) integrated circuit that includes a symmetrical balun antenna coupling structure that meets the differing operational requirements of both the LNA and the PA is achieved.

Figure 4:
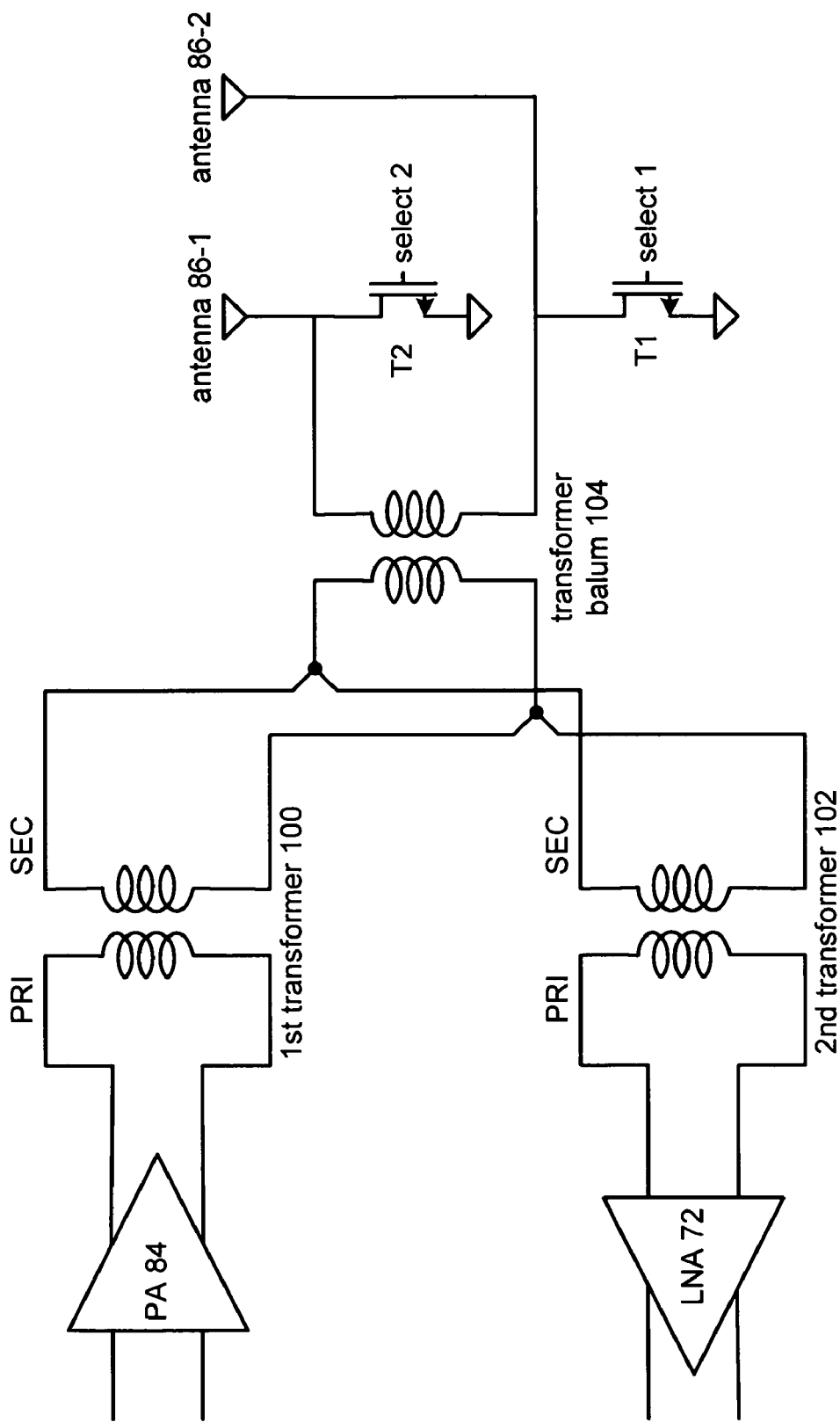
FIG. 4 illustrates a schematic block diagram of another antenna coupling structure in accordance with the present invention.

FIG. 4 is a schematic block diagram of another antenna coupling structure 73 that includes the first transformer 100, the second transformer 102, the transformer balun 104, two antennas 86-1 and 86-2, and a pair of switches. The functionality of the first, second, and balun transformers 100–104 is as previously discussed with reference to FIG. 3.

This embodiment of the antenna coupling structure 73 accommodates a diversity antenna arrangement. As is known, a diversity antenna arrangement includes two or more antennas that are physically spaced by a distance corresponding to a quarter wavelength, a half wavelength, and/or a full wavelength of the RF signals. Based on received signal strength, one of the antennas is selected.

To provide the selection of one of the antennas, the transistors are enabled and disabled. For example, if antenna 86-1 is to be used, select 1 signal is a logic high and select 2 signal is a logic low such that transistor T2 is disabled and transistor T1 is enabled. If, however, antenna 86-2 is to be used, select 1 signal is a logic low and select 2 signal is a logic high, thus enabling transistor T2 and disabling transistor T1.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented an antenna coupling structure that may be implemented on-chip or off-chip of a radio frequency integrated circuit (RFIC). By including the first and second transformers to accommodate for the different requirements of a power amplifier and a low noise amplifier of a RFIC, a single symmetrical transformer balun may be used. As one of average skill in the art will appreciate, other embodiments may be derived from the teachings of the present invention without deviating from the scope of the claims.

What is claimed is:

1. A radio frequency (RF) diversity antenna coupling structure comprises:
    a differential low noise amplifier;
    a differential power amplifier;
    a first switch coupled to a first antenna;
    a second switch coupled to a second antenna;
    a first transformer having a primary winding and a secondary winding, wherein the primary winding of the first transformer is operably coupled to a differential output of the power amplifier, and wherein the secondary winding of the first transformer has a desired output impedance;
    a second transformer having a primary winding and a secondary winding, wherein the primary winding of the second transformer is operably coupled to a differential input of the low noise amplifier, and wherein the secondary winding of the second transformer has a desired output impedance; and
    a transformer balun having a first winding and a second winding, wherein the first winding is operably coupled to the secondary windings of the first and second transformers, one node of the second winding is operably coupled to the first antenna and a second node of the second winding is operably coupled to the second antenna.

2. The RF diversity antenna coupling structure of claim 1 wherein:
    the primary winding of the first transformer having a first impedance; and
    the primary windings of the second transformer having a second impedance, wherein the second impedance is much greater than the first impedance such that the first transformer provides a low drive impedance to substantially match output impedance of the power amplifier and the second transformer provides a high loud impedance to substantially match input impedance of the low noise amplifier.

3. The RF diversity antenna coupling structure of claim 1, wherein the transformer balun further comprises a turns ratio of one-to-one.

4. RF diversity antenna coupling structure of claim 1 wherein:
    the first transformer, the second transformer, and the transformer balun being fabricated on a radio frequency integrated circuit.

5. The RF diversity antenna coupling structure of claim 1, wherein each of the first and second switches comprises a transistor.

* * * * *